Patented Jan. 12, 1954

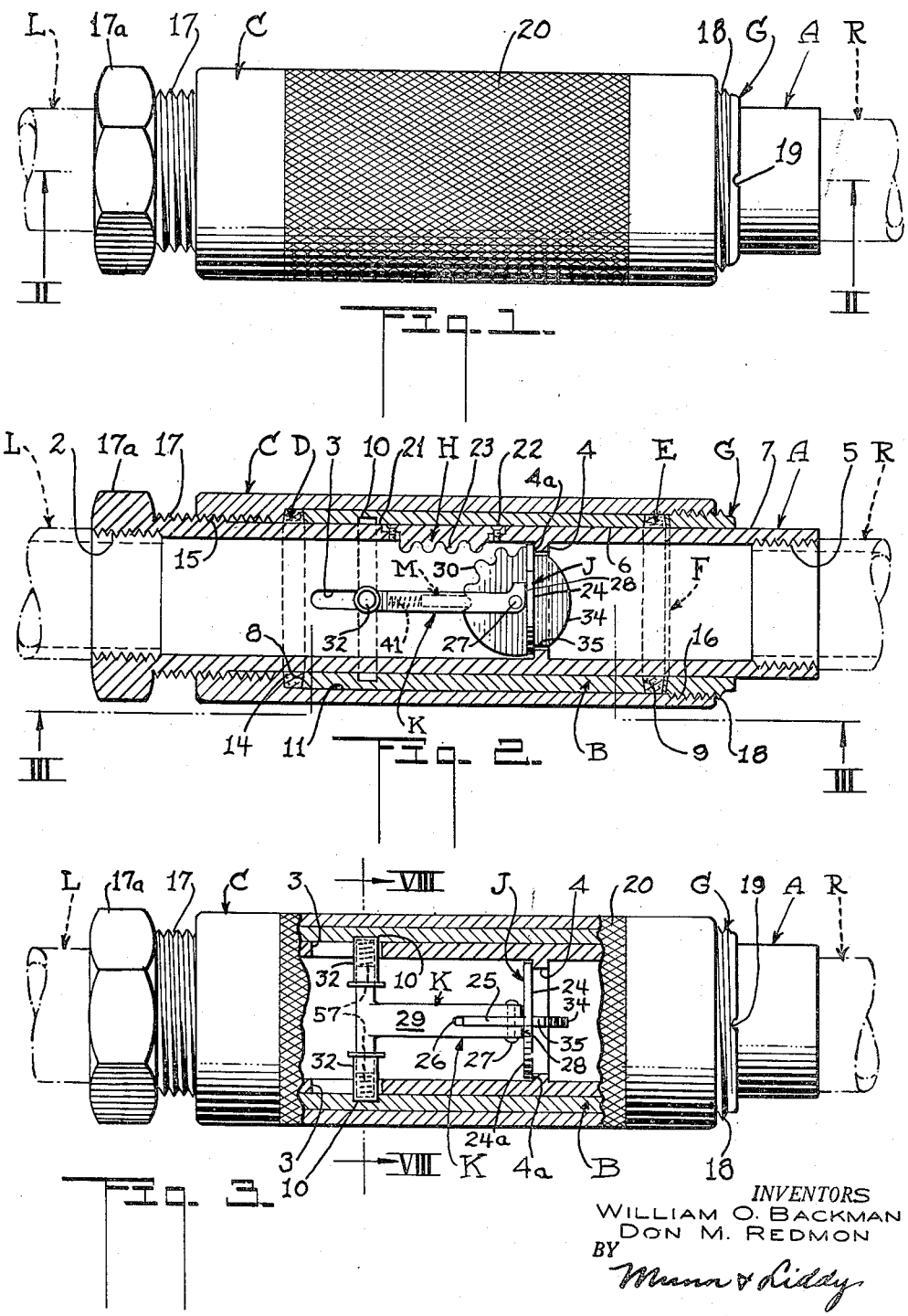

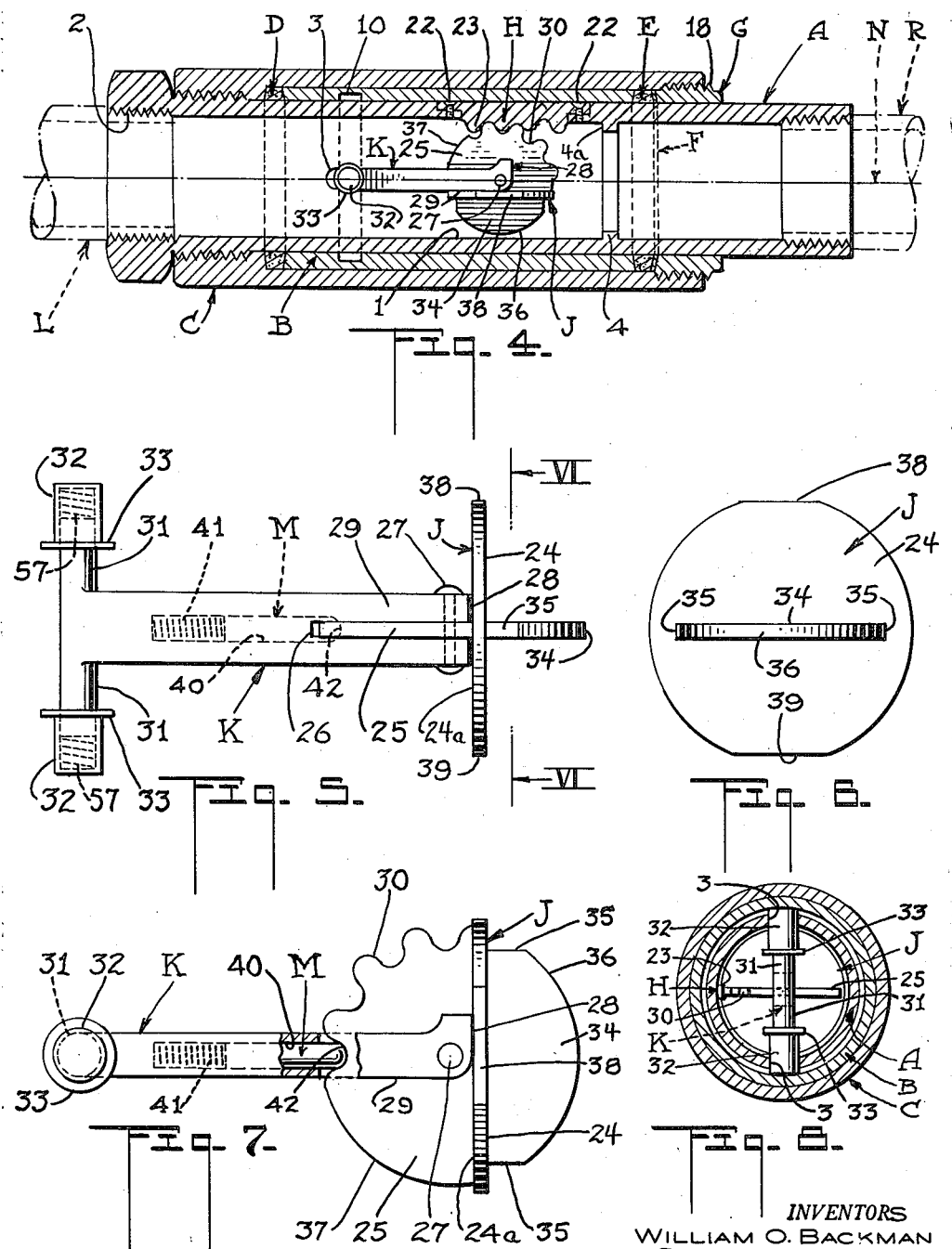

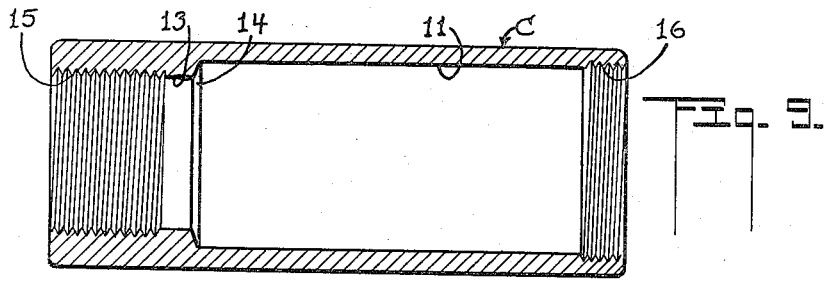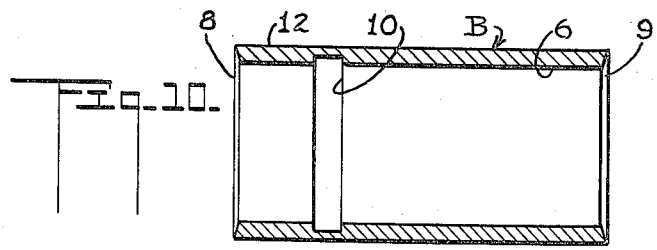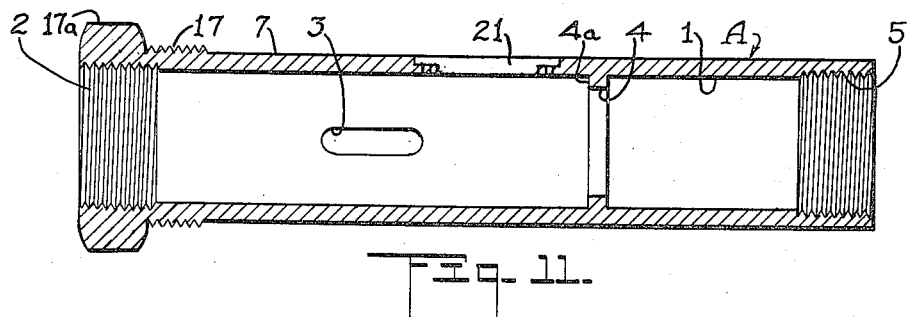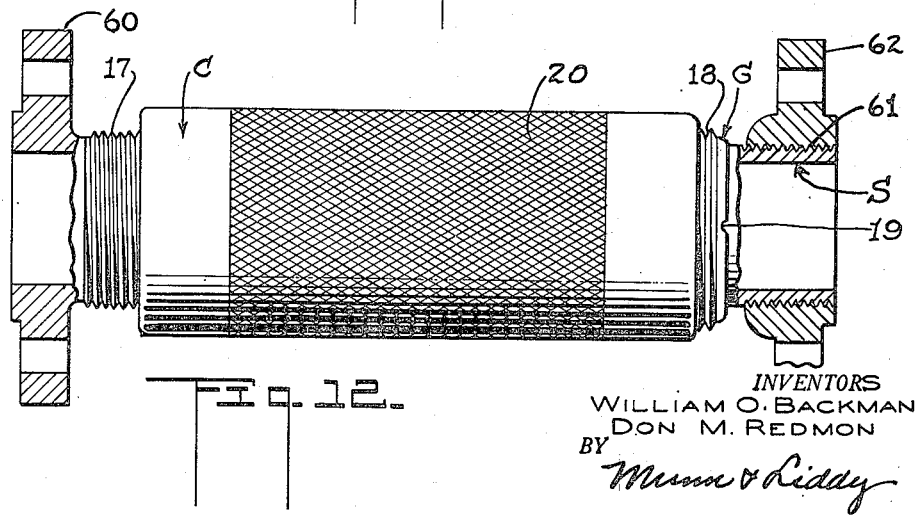

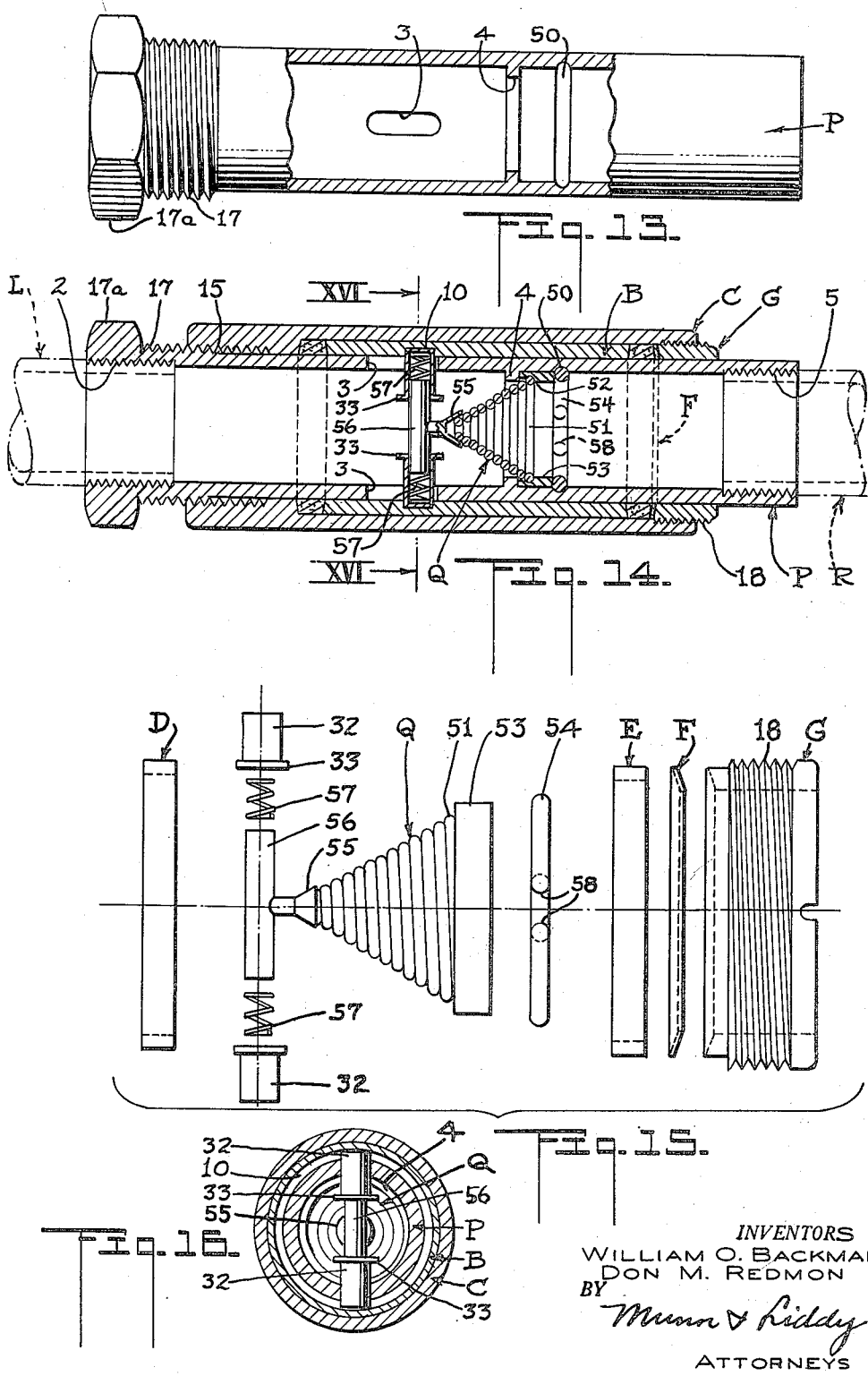

2,665,873

UNITED STATES PATENT OFFICE 2,665,873

IN-LINE VALVE

William O. Backman, Sacramento, and Don M. Redmon, Concord, Calif.

Application January 7, 1952, Serial No. 265,295

9 Claims. (Cl. 251—11)

An object of our invention is to provide an in-line valve in which the valve casing is substantially of the same diameter as the pipe or conduit to which it is connected. All of the working parts of the valve are concealed within the valve casing and we obviate the necessity of causing any pivot pin for the working parts to extend through the valve casing to an exterior point thereof. This does away with the necessity of providing any packing or bearing for such pin and therefore there is no opportunity for the valve to leak through such a bearing or packing.

By mounting all of the working parts within the valve casing, we eliminate external handles, valve stems, packing arrangements, etc. An economy in space is effected. This is obviously an important factor in plumbing installations in locations such as submarines, chemical and industrial plants, etc.

The parts of the valve have been designed with the viewpoint of economizing in cost in the manufacture of the valve. Several of the parts such as the valve housing, inner and outer sleeves, and the compressor ring can be readily produced in turret lathes from bar stock or if castings are resorted to, the simplest type of fixtures can be used. In contrast to this, the usual valves require more complicated fixture set-ups because of the greater number of positions in which the required machining must be accomplished.

The valve has also been designed with the thought of making it easier to assemble and disassemble than with the usual valve. Inasmuch as the parts of the valve are simpler in structure, less material is used and the weight of the valve is reduced.

In the butterfly form of valve illustrated and described in this application, there is practically no more restriction to the flow of material through the valve when opened, than is offered in the standard butterfly valve. Novel means is provided for taking up wear which results after the valve has been used for a considerable time. It is not necessary to remove the valve from the line when taking up wear in the packing.

When the valve body includes the butterfly type of valve, novel means is used for backing the valve away from the valve seat before rotating the valve into open position. The parts are so arranged that the butterfly valve body will be held against lateral movement within the casing when the valve body is in open position.

It is possible to use a conical-shaped coil spring as the combined valve body and valve seat in place of the butterfly valve body. The same control mechanism is used for opening and closing the valve whether the valve body be of the butterfly type or of the conical-shaped coil spring type.

Other objects and advantages will appear in the following specification, and the novel features of the device will be particularly pointed out in the appended claims.

Our invention is illustrated in the accompanying drawings forming a part of this application, in which:

Figure 1 is a side elevation of the in-line valve;

Figure 2 is a longitudinal section taken along the line II—II of Figure 1, and illustrates the butterfly type of valve;

Figure 3 is a section taken along the line III—III of Figure 2, portions of the in-line valve being shown in elevation;

Figure 4 is a sectional view similar to Figure 2, but shows the butterfly valve body in open position;

Figure 5 shows the butterfly type of valve body and part of its operating mechanism on a larger scale than that illustrated in Figure 3;

Figure 6 is an end view of Figure 5 when looking in the direction of the arrows VI—VI of Figure 5;

Figure 7 is a top plan view of Figure 5 and shows a portion of the valve body holding mechanism in section;

Figure 8 is a transverse section taken along the line VIII—VIII of Figure 3;

Figure 9 is a longitudinal section through the outer sleeve which is used for operating the moving parts of the valve;

Figure 10 is a longitudinal section through the inner sleeve which forms a part of the valve body actuating mechanism;

Figure 11 is a longitudinal section through the valve housing;

Figure 12 is a view similar to Figure 1, but shows the valve connectible into a line by means of flanges;

Figure 13 is a view of a modified form of valve housing from that shown in Figure 11;

Figure 14 is a longitudinal section through the modified form of the in-line valve and makes use of a valve body in the shape of a conical coil spring rather than a butterfly valve;

Figure 15 is an enlarged view of the several parts that go to make up the valve body and the associate mechanism illustrated in Figure 14; and Figure 16 is a transverse section taken along the line XVI—XVI of Figure 14.

While we have shown only the preferred forms of our invention, it should be understood that various changes or modifications may be made within the scope of the appended claims without departing from the spirit and scope of the invention.

In carrying out our invention, we will first describe the butterfly type of in-line valve illustrated in Figures 1 to 11, inclusive, and then will show the slight difference between the valve of Figure 12 from that indicated in the first eleven figures. We will then describe the in-line valve that makes use of the conical-shaped coil spring as the valve body.

It is best to refer to Figures 9, 10 and 11 at the start, because these figures show the three members that go to make up the valve housing and the manual operatable sleeves. In Figure 11 a longitudinal section through a valve housing indicated generally at A is shown. The housing is preferably cylindrical in shape and can be of any desired length and diameter and made from any desired material to fit the needs of any particular situation. The inner cylindrical surface 1 of the valve housing is provided with a threaded portion 2 at the left hand end of Figure 11 and with a slot 3 that extends longitudinally with respect to the valve housing. There are actually two slots 3 disposed diametrically opposite to each other, see Figure 3. The inner cylindrical surface 1 also has an inwardly extending annular rib 4 for a purpose which will be described hereinafter. The right hand end of the valve housing A is internally threaded at 5.

Around the valve housing A shown in Figure 11, we mount an inner sleeve indicated generally at B in Figure 10. This sleeve is cylindrical and has its inner surface 6 adapted to receive and contact a portion of the outer surface 7 of the valve housing A, see Figure 2. Again referring to Figure 10, it will be noted that the inner sleeve B has a chamfered end 8 disposed at the left hand end of the cylinder or sleeve and a chamfered end 9 disposed at the right hand edge or end of the same cylinder. Between the chamfered ends 8 and 9, the inner sleeve is provided with an annular groove 10.

In Figure 9, an outer sleeve C is shown in section and it will be noted from this figure that this sleeve is cylindrical and has an inner surface 11 of a slightly larger diameter than the outer surface 12 of the inner sleeve B, see Figure 10. Between the enlarged cylindrical inner surface 11 of the outer sleeve C and a reduced cylindrical portion 13 in the same sleeve, we provide a chamfered portion 14 that interconnects the cylindrical portions 11 and 13. At the left hand end of the outer sleeve C, shown in Figure 9, we provide internal threads 15 and at the right hand end of the same sleeve, we provide internal threads 16. The threads 15 are designed to engage with external threads 17 provided on the outer surface of the valve housing A. Reference to Figure 2 illustrates how the valve housing A, the inner sleeve B and the outer sleeve C, are interconnected to form the casing for the in-line valve.

The manner of assembling these valve casing parts is as follows:

The outer sleeve C is slipped over the right hand end of the valve housing A in Figure 2 and the inner threads 15 of the sleeve are screwed on to the outer threads 17 of the valve housing A for a short distance. A packing ring D is now slipped over the right hand end of the valve housing A and is moved into the space provided between the inner wall 11 of the outer sleeve C and the outer wall 7 of the valve housing A. Next the inner sleeve B is slipped over the right hand end of the valve housing A and is moved inwardly so as to force the packing or sealing ring D up against the chamfered end portion 14 of the outer sleeve, see Figure 9. The chamfered end 8 of the inner sleeve B will press against the opposite side of the sealing ring.

A second packing ring E is slipped over the right hand end of the housing A and is moved into contact with the chamfered end 9 of the inner sleeve B. A slip ring F is moved on to the right hand end of the valve housing A and is designed to bear against the right hand side of the sealing ring E. A compression ring G is likewise moved upon the right hand end of the valve housing A and it has external threads 18 that are designed to be screwed into the internal threads 16 on the outer sleeve C. In Figure 1 we show the compression ring G provided with recesses 19 and they are for the use of a standard wrench, not shown, which may be employed for screwing the compression ring G into place and in tightening the ring against the sealing or packing rings D and E. In this way the valve casing is made water-tight and in case of wear, a mere rotation of the compression ring G will compress the packing rings D and E continuing to make the valve casing water-tight.

The outer surface of the outer sleeve C in Figure 1 is knurled as at 20 for the purpose of permitting the outer sleeve to be grasped by the hand and rotated manually. It is the rotation of the outer sleeve which will cause the valve body, now to be described, to be opened and closed for opening and closing the valve.

It will be noted from Figure 2 that the valve housing A has a rack H mounted in a slot 21. Screws 22, or other suitable fastening means, secure the rack to the valve housing so that the teeth 23 thereof will project inwardly into the interior of the valve housing A. The rack extends longitudinally of the valve housing and so do likewise the teeth 23.

The butterfly valve body which is mounted within the valve housing A is composed of a number of parts which are shown on an enlarged scale in Figures 5, 6 and 7. The valve body itself is indicated generally at J in Figure 5 and it is in reality a butterfly valve so far as its operation is concerned. The valve body J is disc-shaped and is designed to be seated against the annular rib 4 shown in Figure 11, whose left hand face 4a in this figure constitutes a valve seat for the butterfly valve J. Figure 2 illustrates the disc-shaped valve J as being in a position where its right hand face 24 in this figure is bearing against the valve seat 4a so as to stop any flow of material through the interior of the valve housing A.

In order to operate the butterfly valve body J, we provide it with an integral half disc portion 25 that extends at right angles to the plane of the disc J and lies in the longitudinal axis of the valve housing A. The plane of the half disc 25 also extends through the rack teeth 23 of the rack H. The half disc 25 projects from the face 24a of the butterfly valve body J and is pivotally connected to a longitudinally extending butterfly valve body moving arm K. In both Figures 3 and 5, we show the arm K bifurcated by means of a slot 26 that extends inwardly from the right hand end of the arm. The slot slidably receives the half disc 25 and the disc is pivotally mounted in the slot by means of a pin 27, see both Figures 3 and 7. The side walls of the slot 26 act as guides for the half disc 25 and hold the disc against wobbling while permitting the disc to rotate about the pin 27. In Figure 7 we show the right hand end of the arm K provided with a boss that has a flat surface 28 against which the butterfly valve J bears when the valve has been swung into a position where its plane will extend at right angles to the longitudinal axis of the valve housing A. The arm K also has a flat surface 29 which extends at right angles to the surface 28 and against which the butterfly valve J is designed to contact when the valve is in open position as shown in Figure 4. The means for rotating the valve J into its two positions indicated in Figures 2 and 4 will now be described.

The half disc 25 has a quadrant-shaped series of teeth 30, see Figure 7, that are designed to mesh with the rack teeth 23 when the arm K moves the valve J to the left in Figure 2 from its closed position for a predetermined distance. It will be seen from this same figure that the teeth 30 on the half disc 25 do not initially mesh with the teeth 23 on the rack H. It is necessary to move the valve J to the left a slight distance before there is a meshing of the two sets of teeth. This is for the purpose of unseating the valve J from the valve seat 4a before the valve is swung through an arc from closed position to full open position.

In Figure 5, we show the arm K as being T-shaped and provided with oppositely-extending projections 31 disposed at the left hand end of the arm. The projections are cylindrical in shape and are axially aligned with each other, the axis of the projections intersecting the longitudinal axis of the arm K. The longitudinal axis of the arm K coincides with the longitudinal axis of the valve housing A. The arm K is made as narrow as possible in cross sectional width and so are likewise the projections 31 in order to give as full and as unobstructed passageway for the flow of material through the interior of the valve housing as is possible. The outer ends of the projections 31 slidably receive spring pressed caps 32, see Figure 5. The caps 32 have a diameter which will permit them to be slidably received in the slots 3, see Figure 3. It will also be seen from both Figures 2 and 3 that the caps 32 are not only slidably received in the slots 3, but are also slidably received in the annular groove 10 provided in the inner sleeve B.

The construction is such that when the outer sleeve C is rotated with respect to the valve housing A, it will move the inner sleeve B longitudinally along the valve housing A in the desired direction. This movement will cause the annular groove 10 to move the caps 32 in the slots 3 and the caps in turn will act upon the projections 31 and cause the arm K to move to open or close the valve J, or position the valve at any desired angle of opening between its two extreme points. The threaded portions 15 and 17 hold the sleeve C in the position into which it has been moved, and the sleeve in turn will hold the valve body J in fixed position. The caps 32 are provided with flanges 33 for permitting a tool, not shown, to move the caps toward each other, thus freeing them from the annular groove 10 and also from the slots 3 and allowing the valve body J and the arm K to be removed from the interior of the valve housing A after the valve has been disconnected from a conduit L that is shown leading to the left hand end of the valve housing A in Figures 1, 2 and 3. In Figure 1, the housing A is shown provided with a hexagon portion 17a for securing the valve to the conduit L.

Returning to the further description of the butterfly valve body J, it will be noted from Figures 5, 6 and 7, that the valve also has an integral disc-shaped portion or guide vane 34 that extends to the right of the butterfly valve J in Figure 7. This disc-shaped portion has parallel side edges or clearance flats 35 that will extend through the opening provided by inner periphery of the annular rib 4, see Figure 2, when the valve is in closed position. The parallel side edges 35 act as a centering means for the valve body J when it is in closed position. The disc-shaped portion 34 also has an arcuate edge 36 that extends between the parallel sides 35 and is designed to clear the inner periphery of the annular rib 4 when the valve body J is moved from closed position into open position. The arcuate edge 36 of the portion 34 cooperates with another arcuate edge 37 on the half disc 25 and with the teeth 30 for acting as a partial positioning member for holding the valve body J against lateral displacement when the valve is in full open position, see Figure 4. It will be further noted from Figures 6 and 7 that the butterfly valve J has flat top and bottom portions 38 and 39 for the purpose of permitting the butterfly valve body J to swing slightly to one side of the axis line N of the valve housing A when the valve body is in full open position, see Figure 4. The flat surfaces 38 and 39 will contact with the inner cylindrical surface 1 of the valve housing A when the valve body J is in full open position.

We provide novel means for securing the valve body J against free rocking about the pivot 27 from the time the quadrant rack teeth 30 become disengaged from the teeth 23 on the rack H until the valve body J is firmly seated against the valve seat 4a. A spring-pressed pin M is slidably mounted in a bore 40 provided in the arm K. A spring 41 urges the pin M to the right in Figure 7 and the pin enters the recess 42 on the half disc 25 as soon as the quadrant rack 30 is freed from the straight rack 23. The spring-pressed pin M will hold the valve body J from pivoting freely about the pin 27 as the valve body is moved against the valve seat 4a. The spring 41 is weak enough to permit the rotation of the valve body J as soon as the quadrant teeth 30 come into mesh with the rack teeth 23.

From the foregoing description of the various parts of the device, the operation thereof may be readily understood.

Assume that the valve body J is in closed position as indicated in Figure 2 and it is desired to swing it into open position as shown in Figure 4. The outer sleeve C is rotated for moving the sleeve to the left in Figure 2. This will cause the inner sleeve B to move to the left and carry with it the annular groove 10. Inasmuch as the caps 32 are slidably received in the groove 10 and are also slidably received in the slots 3, a movement of the inner sleeve B to the left in Figure 2 and with respect to the valve housing A, will move the arm K to the left. The arm will carry the butterfly valve body J with it and the initial movement of the disc valve J to the left in Figure 2 will cause the plane of the disc valve to remain parallel with the plane of the valve seat 4a. The surface 28 on the arm K, see Figure 7, will prevent the disc valve J from rotating in a counterclockwise direction while the spring-pressed pin M that is mounted within the arm K will engage with the wall of the recess 42 in the half disc 25 and prevent rotation of the valve body J in a clockwise direction during the initial movement of the valve to the left. The valve body J will therefore clear the valve seat 4a before the valve is started in its rotative movement about the pivot pin 27 as a center.

As soon as the teeth 30 in the quadrant gear formed on the disc 25 mesh with the teeth 23 on the stationary rack H, a rotation in a clockwise direction will be imparted to the valve body J as the valve body continues in its movement to the left in Figure 2 due to the arm K moving in the same direction. Figure 8 shows how the arm K with its projections 31 and the caps 32 will offer substantially no more obstruction to the flow of material through the valve interior than does the valve body J, itself. By the time the teeth 30 mesh with the teeth 23, the sides 35 of the disc-shaped portion 34 will have cleared the inner periphery of the annular rib 4. The valve body is now free to rotate in a clockwise direction. The meshing on the teeth 30 with the teeth 23 will rotate the valve body J clockwise and move the spring-pressed lock pin M out of the recess 42 and cause the pin to ride on the arcuate edge 37 of the half disc 25.

The outer sleeve C may be rotated through any desired distance for opening the valve body J to the desired extent. Full open position of the valve body J is reached when the parts are in the position shown in Figure 4. At this point the valve body J is brought into contact with the flat surface 29 of the arm K and further opening of the valve body is prevented. The plane of the valve body J will now be parallel to the longitudinal axis indicated at N in Figure 4. The valve body J while in open position will be held against lateral displacement by the teeth 30 being in mesh with the teeth 23 and the arcuate edge 36 of the member 34 being in contact with the inner surface of the valve housing A. These points of contact between the valve body and the valve housing are sufficient to hold the valve against lateral vibration or displacement in any direction.

In closing the valve, the reverse operation is followed. The outer sleeve C is rotated in a reverse direction and this will cause the arm K to move to the right in Figure 4, and since the teeth 30 are in mesh with the rack teeth 23, an immediate rotation is imparted to the valve body J in a counterclockwise direction. The valve body will be swung into contact with the flat face 28 of the arm K before the valve surface 24 will contact the valve seat 4a. Also the disc-shaped portion 34 will enter the space provided within the inner periphery of the annular rib 4. Further movement of the valve body J to the right in Figure 4 after it has been swung into parallel relation with respect to the valve seat 4a, will move the valve body against the valve seat and thus completely close the valve.

It will be seen from the structure already described that there is no pivot pin for the valve body J extending from the interior of the valve housing A, out through the outer sleeve C. The outer sleeve has no opening in its wall that communicates with the interior of the valve housing A. The valve body operating mechanism has been designed to conceal all of the operating parts within the inner sleeve B and the valve housing A. In case of wear on the packing rings D and E, it is merely necessary to rotate the compression ring G for moving this ring against the packing ring E and compress it more. The same movement of the compression ring G will cause the packing ring E to move the inner sleeve B to the left and compress the packing ring D. The two packing rings D and E are placed on opposite sides of the slots 3 that receive the projections 31 of the arm K. Therefore there can be no leakage of the valve through the slots 3.

The valve interior can be removed by using a tool, not shown, and in the shape of a pair of pliers, and moving the tool through the left hand end of the valve housing A after this housing has been disconnected from the conduit L. The jaws of the tool can then be placed on the surfaces of the flanges 33 and then moved toward each other for retracting the caps 32 from the annular groove 10 and the slots 3. The tool may now be removed from the housing A and will carry with it the arm K and the valve body J. The valve body J should be moved into substantially open position so that it will clear the teeth 23 as the valve body J is removed. It is possible to rotate the arm K on its longitudinal axis N through an arc sufficient to move the caps 32 out of alignment with the slots 3. This same rotational movement will swing the half disc 25 and the disc portion 34 into an angular position where they will clear the teeth 23. After the valve body has been inspected, it may be reinserted and the valve is then ready for further use. We have already described how the inner and outer sleeves B and C are mounted on and connected to the valve housing A.

In Figures 13 to 16, inclusive, we show a slightly modified form of the invention. Where similar parts are used, like reference letters and numbers will be employed. In this modified form, a conical-shaped coil spring is used as the valve body and it serves the additional function as constituting the valve seat. The valve housing shown at P in Figure 13 differs from the valve housing A, shown in Figure 11, in that an annular groove 50 is formed in the interior of the valve housing and to the right of the inwardly extending annular rib 4. In all other respects the valve housing P is the same as the valve housing A and therefore like reference letters and numerals will be applied to similar parts. The slot 21 is not provided in valve housing P.

In place of the butterfly or disc valve body J, shown in detail in Figures 5 to 7, inclusive, we show the combined conical-shaped coil spring valve body and valve seat indicated generally at Q in Figure 15. In Figure 14, we show the large base loop 51 resting in an annular groove 52 formed in a ring 53 that is held against the inwardly extending annular rib 4 by a split ring 54 that is received in the annular groove 50 of the housing P. The small loop at the apex end of the conical coil spring valve Q is received in a conical-shaped member 55. This member takes the place of the arm K in the first form of the device and the member is integral with a transversely extending pin 56, see Figure 15, that takes the place of the two projections 31. In fact the outer ends of the pin 56 slidably receive the caps 32 and the caps house springs 57, where the caps are yieldingly held in the annular groove 10, see Figure 14, and are slidably received in the slots 3.

In Figure 15 the coil spring Q is shown on a larger scale and in closed position with all of the coils bearing against adjacent coils. The ring 53 is also illustrated as well as the split ring 54. In addition, the packing rings D and E are shown prior to their being compressed, and the slip ring F is also shown. The compression ring G is placed to the right of the slip ring F in Figure 15. All of the parts are shown separated in the exploded and enlarged view of Figure 15, and these same parts are shown assembled and placed within the valve housing P in Figure 14. In this figure the combined valve and valve seat Q is shown in closed position.

In the operation of this form of the device, the outer sleeve C is rotated in the same manner as when operating the preferred form of the invention. When the sleeve C is rotated for moving it to the left in Figure 14 the sleeve carries with it the inner sleeve B, and the annular groove 10 in the sleeve B will be moved to the left and carry with it the caps 32. The conical-shaped coil spring Q will have a tendency to assume normal position at all times and this position is when the adjacent coils in the spring are spaced one from the other. In fact, the apex of the conical spring Q will bear against the conical cap 55 and urge it to the left in Figure 14.

When therefore the outer sleeve C and the inner sleeve B are moved to the left, the coils of the conical spring Q will instantly start to move apart. The valve body Q will therefore be gradually opened and the material in the valve housing will be free to move therethrough. The caps 32 with the pin 56 will offer no more obstruction to the flow of material through the valve housing P, than the arm K and associate parts, offer in the preferred form of the device shown in Figure 8. The valve body Q can be closed by rotating the outer sleeve C in the opposite direction. The valve body Q also acts as its own valve seat when all of the loops in the conical coil are brought into contact with the adjacent loops. When this occurs, the valve body Q is closed.

It is possible to remove the valve body Q from the interior of the valve housing F. This is accomplished by using the plier tool, not shown, and inserting it in the right hand end of the valve housing P after this housing has been disconnected from the conduit R. The split ring 54 has inwardly extending ends 58 and these ends are gripped by the jaws of the tool and are moved toward each other when the jaws are closed. This movement will free the split ring from the groove 50 and permit the ring to be removed from the interior of the valve housing P.

The other end of the housing is also disconnected from the conduit L and then the same plier tool is inserted into the valve housing at this end and positioned for the jaws to engage with the flanges 33 on the caps 32. The jaws of the tool are moved toward each other and this will free the caps from the annular groove 10 and from the slots 3. Inasmuch as the apex of the conical-shaped spring need not be permanently secured to the conical-shaped member 55, this member may be removed with the pin 56 and the caps 32 from the left hand end of the valve housing P. The apex of the spring valve body Q can be permanently secured to the cap 55 and when this is true, the conical-shaped coil spring Q will be removed with the conical cap 55 and the pin 56. The base loop 51 will be pulled free of the recess 52. The ring 53 can be removed from the right hand end of the valve housing P. The entire valve body and its associate parts can be inspected when thus removed and then reinserted for further use. Any part that has become worn can be thrown away and a new part substituted.

The taking up of wear in the modified form of valve is accomplished in the same manner as in the preferred form and therefore further description of this phase of the valve need not be given. The assembling of the inner sleeve B and the outer sleeve C on the valve housing P is accomplished in the same manner as that already set forth in the preferred form.

In Figure 12, we show a slightly modified form of valve housing S which can be used in place of the valve housing A, or the valve housing P. In both the former valve housings, the connections with the conduits L and R are made by screw threads. Where it is desired to use flanges for connecting the valve housing S with the conduits L and R, and not shown in Figure 12, the left hand end of the valve housing S can be provided with a flange 60. This flange is integral with the valve housing S and takes the place of the internal threads 2 shown in Figure 11 in the housing A.

The other end of the valve housing S is threaded exteriorly at 61 and takes the place of the internal threads 5 shown in Figure 11 for the housing A. A removable flange 62 is provided with a bore that is internally threaded and the external threads 61 of the housing S are designed to receive the internal threads of the removable flange. In this way the removable flange 62 is connected to the valve housing S and is also adjustably mounted on the housing. The conduits L and R are provided with flanges not shown in Figure 12, and these may be removably connected to the flanges 60 and 62. The in-line valve is operatively connected to the conduits L and R by this arrangement of parts. The valve housing S may contain either the butterfly valve body J and its associate parts or the combined spring valve and valve seat and its associate parts. The flanges 60 and 62 are used in larger type valves.

It should be noted that the left hand end of the outer sleeve C, abuts the adjacent surface of the hexagon head 11a of the valve housing A, when the valve body J is in full open position. This will prevent further rotation of the outer sleeve C in the same direction and preclude any damage being done to the valve body J which would otherwise result if the sleeve C tended to rotate the valve body J during the opening movement of the body after the latter has contacted the surface 29 of the arm K.

We claim:

1. An in-line valve comprising a cylindrical valve housing adapted to be connected into a line through which material flows; said housing having longitudinally extending slots disposed diametrically opposite to each other; a valve body mounted within the housing and being movable from open to closed position and vice versa; means for moving the valve body and including axially aligned members that extend at right angles to the longitudinal axis of the housing; spring pressed caps slidably carried by the axially aligned members at their outer ends and being slidably received in the slots; an inner sleeve slidable along the valve housing and covering the slots; said sleeve having an inner annular groove designed to slidably receive the outer ends of the caps; an outer sleeve enclosing the inner sleeve and adjustably connected to the valve housing; means for connecting the two sleeves together so that a longitudinal movement of the outer one with respect to the valve housing will move the inner one in the same direction and cause its annular groove to move the caps in the slots and move the valve body opening and closing means in the desired direction.

2. The combination as set forth in claim 1, and in which the outer sleeve has an annular shoulder disposed adjacent to the outer surface of the valve housing; a packing ring mounted on the valve housing and bearing against the shoulder; one end of the inner sleeve bearing against the packing ring; a second packing ring mounted on the valve housing and bearing against the other end of the inner sleeve; and a compression ring slidable along the valve housing and having a threaded connection with the outer sleeve and bearing against the second packing ring for compressing it; the compression ring being rotatable for moving it toward the second packing ring for compressing it and for causing the inner sleeve to compress the first packing ring for providing a leak-proof connection between the inner sleeve and the valve housing and on opposite sides of the slots in the housing.

3. In an in-line valve: a cylindrical valve housing having a rack in its wall with the teeth facing inwardly and lying in a line that parallels the longitudinal axis of the housing; an arm disposed within the housing and being movable along the housing axis; said housing having an annular valve seat spaced from the rack; a butterfly valve body pivotally carried by the arm and adapted to bear against the valve seat when the valve is closed; a quadrant gear integral with the valve body and placed in line with the rack so that when the arm is moved for moving the quadrant gear toward the rack, the butterfly valve body will be moved clear of the valve seat prior to the quadrant meshing with the rack; and means for moving the arm for causing the valve body to be moved away from the valve seat; further movement of the means, causing the quadrant to mesh with the rack and rotate the valve body about its pivot into open position.

4. The combination set forth in claim 3, and in which spring-pressed locking means is carried by the arm and engages with the quadrant for holding the valve body against free swinging about its pivot from the time the valve body is moved away from the valve seat up to the time the quadrant meshes with the rack.

5. In an in-line valve: a cylindrical valve housing having a rack in its wall with the teeth facing inwardly and lying in a line that parallels the longitudinal axis of the housing; an arm disposed within the housing and being movable along the housing axis; said housing having an annular valve seat spaced from the rack; a butterfly valve body pivotally carried by the arm and adapted to bear against the valve seat when the valve is closed; a quadrant gear integral with the valve body and extending at right angles thereto; said arm being slotted for rotatably receiving the quadrant and constituting a bearing surface for supporting the quadrant in the various positions into which it may be swung; the quadrant gear being in line with the rack so that when the arm is moved for moving the quadrant gear toward the rack, the butterfly body will be moved clear of the valve seat prior to the quadrant meshing with the rack; and means for moving the arm for causing the valve body to be moved away from the valve seat; further movement of the means, causing the quadrant to mesh with the rack and rotate the valve body about its pivot into open position.

6. The combination set forth in claim 5, and in which spring-pressed locking means is carried by the arm and engages with the quadrant for holding the valve body against free swinging about its pivot from the time the valve body is moved away from the valve seat up to the time the quadrant meshes with the rack.

7. In an in-line valve: a cylindrical valve housing having a rack in its wall with the teeth facing inwardly and lying in a line that parallels the longitudinal axis of the housing; an arm disposed within the housing and being movable along the housing axis; said housing having an annular valve seat spaced longitudinally from the rack; a butterfly valve body pivotally carried by the arm and adapted to bear against the valve seat when the valve is closed; a quadrant gear integral with the valve body and extending at right angles thereto from one face thereof; the quadrant gear being in line with the rack so that when the arm is moved for moving the quadrant gear toward the rack, the butterfly valve body will be moved clear of the valve seat prior to the quadrant meshing with the rack; a guide vane projecting from the other face of the valve body and adapted to enter an opening defined by the valve seat when the valve is moved into closed position for aiding the valve in seating properly; means for moving the arm for removing the valve body from the valve seat and causing the quadrant gear to mesh with the rack for rotating the valve body about its pivot into open position; the guide vane contacting with the inner wall of the valve housing when the valve body is in open position, and cooperating with the quadrant gear that meshes with the rack, for holding the valve body against lateral movement with respect to the valve housing.

8. An in-line valve comprising a cylindrical valve housing adapted to be connected into a line through which material flows; said housing having longitudinally extending slots disposed diametrically opposite to each other; a valve body mounted within the housing and being movable from open to closed position and vice versa; means for moving the valve body and including axially aligned members that extend at right angles to the longitudinal axis of the housing; spring pressed caps slidably carried by the axially aligned members at their outer ends and being slidably received in the slots; an inner sleeve slidable along the valve housing and covering the slots; said sleeve having an inner annular groove designed to slidably receive the outer ends of the caps; an outer sleeve enclosing the inner sleeve and adjustably connected to the valve housing; means for connecting the two sleeves together so that a longitudinal movement of the outer one with respect to the valve housing will move the inner one in the same direction and cause its annular groove to move the caps in the slots and move the valve body opening and closing means in the desired direction; the cylindrical valve housing having an annular and inwardly-extending rib therein; a ring held against the rib; a conical cap carried by the said axially-aligned members; the valve body comprising a conical-shaped coil spring having its base loop contacting the ring, and its apex loop being received in said conical cap; the latter, when moved in one direction, permitting the loops of the conical-shaped spring to open with respect to each other for providing a passage through the valve housing, and when moved in the opposite direction causing the loops in this spring to be moved into contact with each other to close said passage.

9. An in-line valve comprising a cylindrical valve housing adapted to be connected into a line through which material flows; said housing having longitudinally extending slots disposed diametrically opposite to each other; a valve body mounted within the housing and being movable from open to closed position and vice versa; means for moving the valve body and including axially aligned members that extend at right angles to the longitudinal axis of the housing; spring pressed caps slidably carried by the axially aligned members at their outer ends and being slidably received in the slots; an inner sleeve slidable along the valve housing and covering the slots; said sleeve having an inner annular groove designed to slidably receive the outer ends of the caps; an outer sleeve enclosing the inner sleeve and adjustably connected to the valve housing; means for connecting the two sleeves together so that a longitudinal movement of the outer one with respect to the valve housing will move the inner one in the same direction and cause its annular groove to move the caps in the slots and move the valve body opening and closing means in the desired direction; the valve body comprising a conical-shaped coil spring interposed between said axially-aligned members and the cylindrical valve housing; the base loop of this coil spring being anchored against movement in one direction relative to said housing, and its apex loop arranged to urge said axially-aligned members in the opposite direction; said members, when moved in one direction, permitting the loops of the conical-shaped spring to open with respect to each other for providing a passage through the valve housing, and when moved in the opposite direction causing the loops in this spring to be moved into contact with each other for closing the passage.

WILLIAM O. BACKMAN.
DON M. REDMON.

References Cited in the file of this patent
UNITED STATES PATENTS

| Number | Name | Date |
|---|---|---|
| 763,643 | Stoddard | June 28, 1904 |
| 1,813,581 | Rodrigues | July 7, 1931 |
| 2,354,310 | Goodwin | July 25, 1944 |
| 2,556,583 | Hinz | June 12, 1951 |